US011023268B2

(12) United States Patent
Oe

(10) Patent No.: US 11,023,268 B2
(45) Date of Patent: Jun. 1, 2021

(54) COMPUTER SYSTEM AND COMPUTER

(71) Applicant: HITACHI, LTD., Tokyo (JP)

(72) Inventor: Yumiko Oe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 299 days.

(21) Appl. No.: 16/288,983

(22) Filed: Feb. 28, 2019

(65) Prior Publication Data

US 2019/0370047 A1 Dec. 5, 2019

(30) Foreign Application Priority Data

May 30, 2018 (JP) .............................. JP2018-104105

(51) Int. Cl.
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/067* (2013.01); *G06F 3/0664* (2013.01); *G06F 2009/4557* (2013.01); *G06F 2009/45595* (2013.01)

(58) Field of Classification Search
CPC ......... G06F 9/45558; G06F 2009/4557; G06F 2009/45595; G06F 3/0604; G06F 3/0664; G06F 3/067; H04L 12/46; H04L 67/1004; H04L 67/1008; H04L 67/101; H04L 67/1012; H04L 67/1023
See application file for complete search history.

(56) References Cited

U.S. PATENT DOCUMENTS

| 8,370,530 | B2 * | 2/2013 | Tripathi .............. G06F 9/45558 |
| | | | 709/250 |
| 2003/0149755 | A1 * | 8/2003 | Sadot ................. H04L 67/1021 |
| | | | 709/223 |
| 2006/0209697 | A1 * | 9/2006 | Fujino .................. H04L 45/123 |
| | | | 370/238 |
| 2010/0027420 | A1 * | 2/2010 | Smith .................... H04L 47/70 |
| | | | 370/235 |

(Continued)

FOREIGN PATENT DOCUMENTS

JP           6211062 A          9/2017

*Primary Examiner* — Emerson C Puente
*Assistant Examiner* — Zhi Chen
(74) *Attorney, Agent, or Firm* — Volpe Koenig

(57) ABSTRACT

A computer system comprises a storage unit which stores communication information that passes through a path control virtual machine as a virtual machine which performs path control of communication between a plurality of virtual machines and a physical machine, virtual machine information shows a status of use of the plurality of virtual machines, placement information shows a physical host configured from the plurality of virtual machines, physical resource information shows a status of use of physical resources in the physical host, and path information shows a path of communication between the plurality of virtual machines and the physical machine, and a placement processing unit selects a physical host to place the path control virtual machine based on the virtual machine information, the placement information and the physical resource information, and calculates a communication cost on an assumption that the path control virtual machine is placed in the selected physical host.

5 Claims, 10 Drawing Sheets

(56) References Cited

U.S. PATENT DOCUMENTS

| | | | |
|---|---|---|---|
| 2013/0047151 A1* | 2/2013 | Sridharan | G06F 9/45558 718/1 |
| 2013/0287022 A1 | 10/2013 | Banavalikar et al. | |
| 2014/0149493 A1* | 5/2014 | Acer | H04L 67/1023 709/203 |
| 2014/0169215 A1* | 6/2014 | Rajendran | H04L 49/70 370/254 |
| 2015/0378760 A1* | 12/2015 | Su | G06F 9/45558 718/1 |
| 2016/0266938 A1* | 9/2016 | Suzuki | G06F 9/54 |
| 2017/0257424 A1* | 9/2017 | Neogi | H04L 43/16 |
| 2017/0289065 A1* | 10/2017 | Zhu | H04L 12/4633 |
| 2017/0337086 A1* | 11/2017 | Zhu | G06F 9/5016 |
| 2018/0329788 A1* | 11/2018 | Blum | G06F 11/3688 |
| 2019/0018698 A1* | 1/2019 | Wang | G06F 9/45558 |

\* cited by examiner

FIG.4

| # | COMMUNICATION THAT PASSES THROUGH VMr | | PACKET COUNT |
|---|---|---|---|
| 1 | VMa | PHYSICAL MACHINE A | 30 |
| 2 | VMb | PHYSICAL MACHINE B | 100 |

| # | VIRTUAL MACHINE NAME | NUMBER OF VIRTUAL CPUs | VIRTUAL MEMORY SIZE | CPU UTILIZATION RATE | HOST NAME |
|---|---|---|---|---|---|
| 1 | VMa | 4 | 32GB | 30% | PHYSICAL HOST A |
| 2 | VMb | 2 | 16GB | 15% | PHYSICAL HOST B |
| 3 | VMr | 4 | 2GB | 80% | PHYSICAL HOST C |

| # | PHYSICAL HOST NAME | CPU UTILIZATION RATE | MEMORY UTILIZATION RATE |
|---|---|---|---|
| 1 | PHYSICAL HOST A | 50% | 70% |
| 2 | PHYSICAL HOST B | 40% | 80% |
| 3 | PHYSICAL HOST C | 35% | 65% |

| # | COMMUNICATION | | HOP COUNT |
|---|---|---|---|
| 1 | PHYSICAL HOST A | PHYSICAL HOST B | 2 |
| 2 | PHYSICAL HOST A | PHYSICAL HOST C | 3 |
| 3 | PHYSICAL HOST A | PHYSICAL MACHINES A, B | 4 |
| 4 | PHYSICAL HOST B | PHYSICAL HOST C | 2 |
| 5 | PHYSICAL HOST B | PHYSICAL MACHINES A, B | 3 |
| 6 | PHYSICAL HOST C | PHYSICAL MACHINES A, B | 2 |

| # | PHYSICAL HOST NAME | SETTABLE IP ADDRESS RANGE | IN-USE IP ADDRESS |
|---|---|---|---|
| 1 | PHYSICAL HOST A | 172.26.10.11~172.26.10.15 | — |
| 2 | PHYSICAL HOST B | 172.26.20.11~172.26.20.15 | 172.26.20.11 ⇒ — |
| 3 | PHYSICAL HOST C | 172.26.30.11~172.26.30.15 | — ⇒ 172.26.30.11 |
| 4 | PHYSICAL HOST D | | |

| DESTINATION PHYSICAL HOST | PHYSICAL HOST A | PHYSICAL HOST B | PHYSICAL HOST C |
|---|---|---|---|
| TOTAL COMMUNICATION COST | 950 | 780 | 480 |

(B)

| DESTINATION PHYSICAL HOST | PHYSICAL HOST A | PHYSICAL HOST B | PHYSICAL HOST C |
|---|---|---|---|
| TOTAL COMMUNICATION COST | 950 | 780 | 700 |

COMPUTER SYSTEM AND COMPUTER

TECHNICAL FIELD

The present invention relates to a computer system and a computer, and, for example, can be suitably applied to the path control of communication between a plurality of virtual machines which are communicable via a virtual network, and a physical machine, in an environment that differs from the environment of the virtual network.

BACKGROUND ART

In recent years, pursuant to the development of cloud computing, network virtualization using SDN (Software Defined Networking) or the like is becoming prevalent (refer to PTL 1).

For instance, with systems in a data center, there are applications and networks that cannot be virtualized, and there are cases where communication between a virtual network (for example, VXLAN: Virtual eXtensible Local Area Network) and a physical network (for example, VLAN: Virtual Local Area Network) is required.

CITATION LIST

Patent Literature

[PTL 1] Japanese Patent No. 6211062

SUMMARY OF THE INVENTION

Problems to be Solved by the Invention

When communication is to be performed between a virtual network and a physical network, it is necessary to go through a virtual appliance (for example, a virtual machine which provides a routing function) which connects a virtual network and a physical network, and the administrator manually places the virtual appliance in the infrastructure.

Nevertheless, in cases where the virtual machines of a business system migrate continually or the communication status changes dynamically as with the structure of cloud computing, there is a problem in that the communication path becomes redundant depending on the overall placement status when the virtual appliances are placed at fixed positions.

The present invention was devised in view of the foregoing points, and proposes a computer system and a computer capable of optimizing the communication path.

Means to Solve the Problems

In order to achieve the foregoing object, the present invention provides a computer system comprising a plurality of virtual machines which are communicable via a virtual network, and a physical machine which is communicable with the plurality of virtual machines in an environment that differs from the environment of the virtual network, comprising: a storage unit which stores communication information that passes through a path control virtual machine as a virtual machine which performs path control of communication between the plurality of virtual machines and the physical machine, virtual machine information which shows a status of use of the plurality of virtual machines, placement information which shows a physical host in which the plurality of virtual machines are placed, physical resource information which shows a status of use of physical resources in the physical host, and path information which shows a path of communication between the plurality of virtual machines and the physical machine; and a placement processing unit which selects a physical host in which the path control virtual machine can be placed based on the virtual machine information, the placement information and the physical resource information, and calculates a communication cost on an assumption that the path control virtual machine is placed in the selected physical host based on the communication information, the placement information and the path information.

The present invention additionally provides a computer, comprising: a storage unit which stores communication information that passes through a path control virtual machine as a virtual machine which performs path control of communication between a plurality of virtual machines which are communicable via a virtual network, and a physical machine which is communicable with the plurality of virtual machines in an environment that differs from the environment of the virtual network, virtual machine information which shows a status of use of the plurality of virtual machines, placement information which shows a physical host in which the plurality of virtual machines are placed, physical resource information which shows a status of use of physical resources in the physical host, and path information which shows a path of communication between the plurality of virtual machines and the physical machine; and a placement processing unit which selects a physical host in which the path control virtual machine can be placed based on the virtual machine information, the placement information and the physical resource information, and calculates a communication cost on an assumption that the path control virtual machine is placed in the selected physical host based on the communication information, the placement information and the path information.

According to the foregoing configuration, because it is possible to calculate the communication cost on the assumption that a path control virtual machine is placed in a physical host in which the path control virtual machine can be placed, for instance, it will be possible to place the path control virtual machine in the physical host with the lowest communication cost.

Advantageous Effects of the Invention

According to the present invention, it is possible to improve the communication performance.

BRIEF DESCRIPTION OF DRAWINGS

FIG. 4 is a diagram showing an example of the communication information according to the first embodiment.

FIG. 5 is a diagram showing an example of the virtual machine information/placement information according to the first embodiment.

FIG. 6 is a diagram showing an example of the physical resource information according to the first embodiment.

FIG. 7 is a diagram showing an example of the path information according to the first embodiment.

FIG. 8 is a diagram showing an example of the IP address setting information according to the first embodiment.

FIGS. 12 (A) and 12(B) are diagrams showing an example of the total communication cost according to the first embodiment.

DESCRIPTION OF EMBODIMENTS

An embodiment of the present invention is now explained in detail with reference to the appended drawings.

(1) First Embodiment

Figure 1:
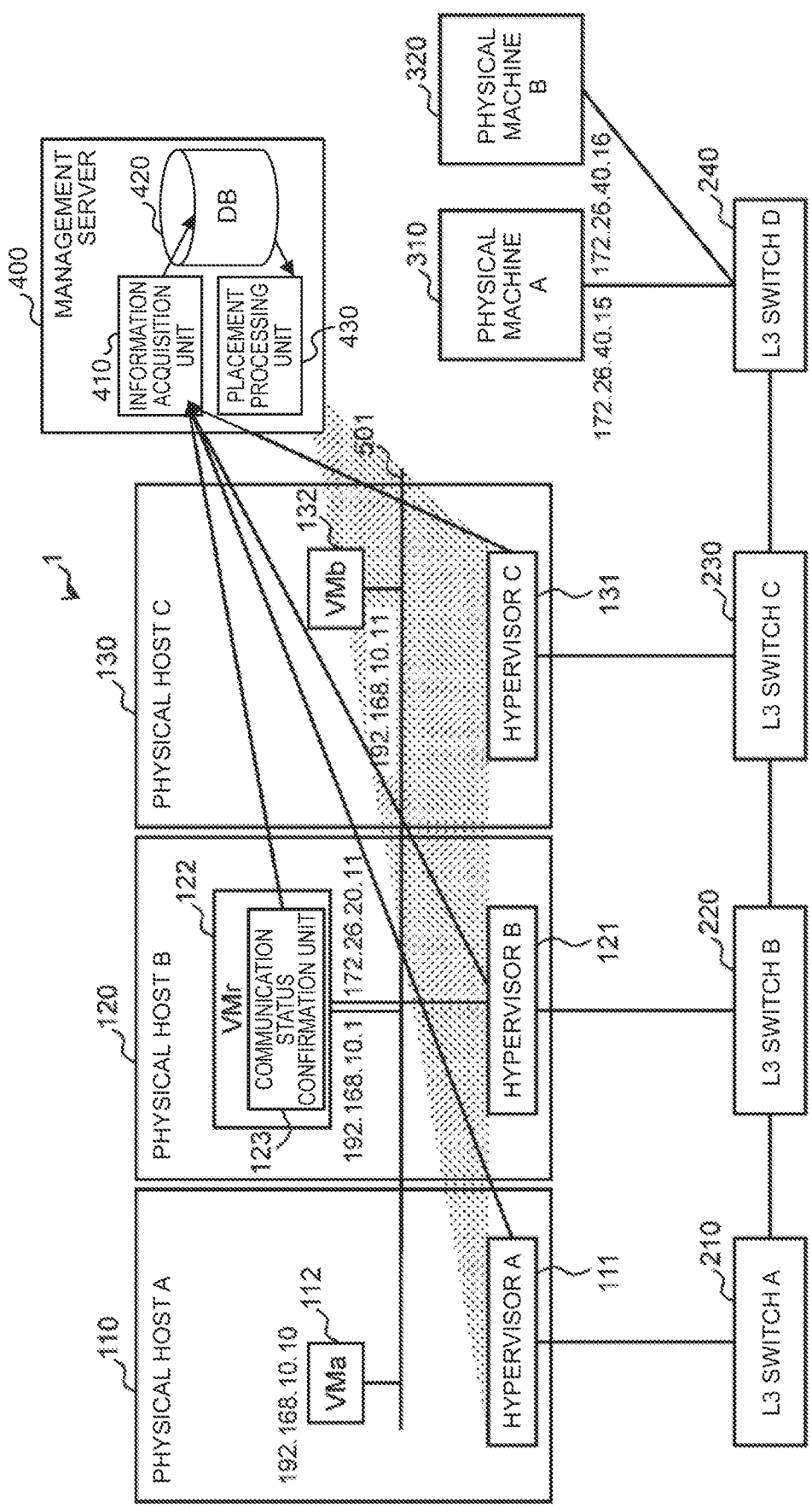
FIG. 1 is a diagram showing an example of the configuration of the computer system according to the first embodiment.

In FIG. 1, reference numeral 1 shows an overall computer system according to the first embodiment. The computer system 1 comprises a plurality of physical hosts (in this example, physical host A110, physical host B120, physical host C130), physical machines (in this example, physical machine A310, physical machine B320) that are communicably connected to the physical hosts via L3 switches (in this example, L3 switch A210, L3 switch B220, L3 switch C230, L3 switch D240), and a management server 400 which manages communication between the physical hosts and the physical machines.

The physical host is a computer, and is configured by a CPU (Central Processing Unit), a memory such as a RAM (Random Access Memory), and a communication device such as an HBA (Host Bus Adapter) or an NIC (Network Interface Card), which are not shown in FIG. 1.

The physical host is provided with a control program (hypervisor) for realizing a virtual machine (VM: Virtual Machine). While there is no particular limitation regarding the type of hypervisor (hypervisor type which directly operates on the hardware, host OS type which operates on the host OS, etc.), the hypervisor type is used as the example in the ensuing explanation.

For instance, with the physical host A110, a VMa 112 (virtual machine) operates on a hypervisor A111. The hypervisor A111, for example, performs control of the VMa 112, and manages the status of use (number of virtual CPUs, virtual memory size, etc. described later) of the VMa 112, and the status of use (CPU utilization rate, memory utilization rate, etc.) of the hardware resource (physical resource) assigned to the VMa 112. The hypervisor A111 sends the information that it is managing to the management server 400.

With the physical host B120, a VMr 122 (path control virtual machine as a virtual machine which performs path control of communication between a virtual machine and a physical machine) which provides a routing function operates on a hypervisor B121. The hypervisor B121, for example, performs control of the VMr 122, and manages the status of use (number of virtual CPUs, virtual memory size, etc. described later) of the VMr 122, and the status of use (CPU utilization rate, memory utilization rate, etc.) of the hardware resource (physical resource) assigned to the VMr 122. The hypervisor B121 sends the information that it is managing to the management server 400.

The VMr 122 performs conversion of the IP address (Internet Protocol address) of the connection between the virtual network 501 and the physical network. Moreover, the VMr 122 acquires communication information in the virtual network 501 and the physical network, and sends the acquired communication information to the management server 400 (example of the communication status confirmation unit 123).

With the physical host C130, a VMb 132 (virtual machine) operates on a hypervisor C131. The hypervisor C131, for example, performs control of the VMb 132, and manages the status of use (number of virtual CPUs, virtual memory size, etc. described later) of the VMb 132, and the status of use (CPU utilization rate, memory utilization rate, etc.) of the hardware resource (physical resource) assigned to the VMb 132. The hypervisor C131 sends the information that it is managing to the management server 400.

A virtual machine on each physical host is able to communicate by using a virtual network 501. The virtual network 501 is realized with a VXLAN (Virtual Extensible Local Area Network) as a protocol capable of building a network of a logical layer 2 (L2) on a network of a layer 3 (L3). With the VXLAN, by separating various tables (for example, MAC address table) for managing a physical network from a physical switch (L2 switch) and managing them with a hypervisor, the same level of service as a physical network can be provided even without having to depend on a physical network.

More specifically, a hypervisor of each physical host has an IP address, and the overlay communication of the VXLAN is performed between the IP addresses. For example, when the VMa 112 performs communication with the VMb 132, the hypervisor A111 refers to the MAC address table acquired in advance, and, by configuring the original frame generated by the VMa 112 as capsulated (added with VXLAN header) packets with the VXLAN, the packets will tunnel the L3 switch A210, the L3 switch B220, and the L3 switch C230, and reach the hypervisor C131. With the hypervisor C131, the VXLAN header is removed from the received packets, and the original frame is transferred to the VMb 132.

Moreover, a virtual machine on each physical host is capable of communicating with a physical machine in a physical environment that differs from the virtual network 501. Here, the VMr 122 has a routing table, and performs path control according to the routing table. For example, when the VMa 112 is to communicate with the physical machine A310, the hypervisor A111 foremost recognizes that the physical machine A310 exists in a different subnet. Next, the hypervisor A111 refers to the MAC address table and transfers the packets to the VMr 122, which is a default gateway. The VMr 122 transfers, to the physical machine A310, the original frame, in which the VXLAN header was removed from the packets by the hypervisor B121, by referring to the routing table.

Here, the routing information of the routing table may be managed based on static routing, or may be managed based on dynamic routing. In the ensuing explanation, an example of using dynamic routing is explained. For example, the VMr 122 exchanges routing information via a routing protocol such as an OSPF (Open Shortest Path First) with the L3 switch or a BGP (Border Gateway Protocol). With the foregoing dynamic routing, the L3 switch and the VMr 122 mutually exchange routing information that they each have according to the routing protocol, the L3 switches also mutually exchange routing information that they each have, and the routing information is automatically generated and updated.

The physical machine is a computer, and is configured by a CPU, a memory such as or a RAM, and a communication device such as an HBA or an NIC, which are not shown in FIG. 1. The physical machine communicates with a physical host, stores various types of information, and processes such information. The physical machine, for example, has an application that cannot be virtualized.

The management server 400, for example, calculates information regarding the placement of the VMr 122, in which the communication path becomes optimal, based on communication information that passes through the VMr 122. Moreover, for example, the management server 400 places the VMr 122 based on the calculated information. Moreover, for example, the management server 400 adds a virtual machine which provides a routing function based on communication information that passes through the VMr 122.

The management server 400 comprises an information acquisition unit 410, a database 420 (DB), and a placement processing unit 430. Details of the information acquisition unit 410, the database 420 (DB), and the placement processing unit 430 will be described later with reference to FIG. 3.

Figure 2:
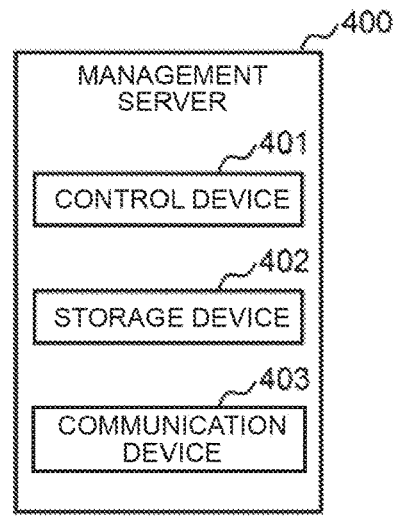
FIG. 2 is a diagram showing an example of the configuration of the hardware of the management server according to the first embodiment.

FIG. 2 is a diagram showing an example of the configuration of the hardware of the management server 400.

The management server 400 is, for example, a computer, and is configured by including a control device 401, a storage device 402, and a communication device 403. The control device 401 is, for example, a CPU, and processes various types of information. The storage device 402 is a storage unit such as a RAM, a ROM (Read Only Memory), or an HDD (Hard Disk Drive), and stores various types of information. The communication device 403 is an HBA, an NIC or the like, and controls communication with the physical host.

The functions (information acquisition unit 410, placement processing unit 430, etc. described later) of the management server 400, for example, may be realized by the CPU reading programs stored in the ROM and executing the programs (software), or may be realized with hardware such as a dedicated circuit, or may be realized by combining software and hardware. Moreover, a part of the functions of the management server 400 may be realized with another computer capable of communicating with the management server 400.

Furthermore, the management server 400 may communicate with the physical host via the virtual network 501, or may be a physical environment that differs from the virtual network 501 in the same manner as the physical machine.

Figure 3:
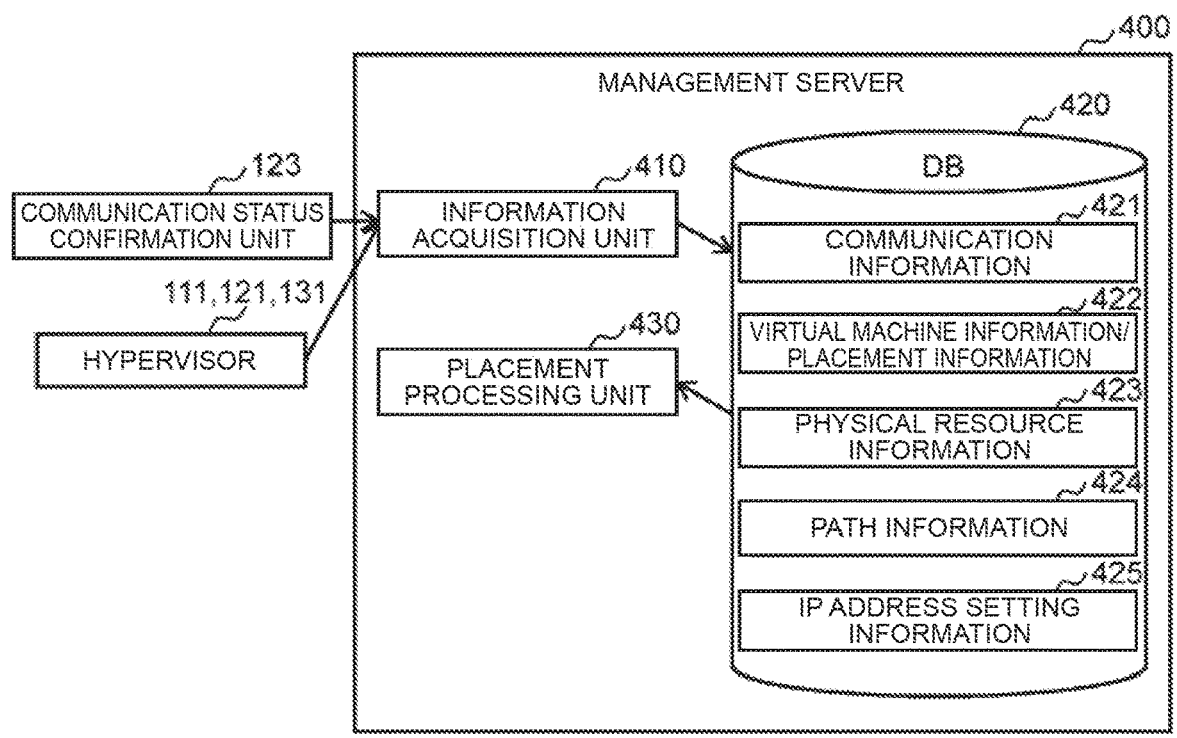
FIG. 3 is a diagram showing an example of the configuration of the software of the management server according to the first embodiment.

FIG. 3 is a diagram showing an example of the configuration of the software of the management server 400.

The management server 400 includes an information acquisition unit 410, a database 420, and a placement processing unit 430.

The information acquisition unit 410 acquires communication information (communication status) of the VMr 122 from the communication status confirmation unit 123, and stores the acquired communication information (communication status) as the communication information 421 in the database 420. The information acquisition unit 410 acquires virtual machine information, placement information, physical resource information, and path information from each hypervisor, and stores the acquired information as the virtual machine information/placement information 422, the physical resource information 423, and the path information 424 in the database 420.

The database 420 stores IP address setting information 425 in addition to the communication information 421, the virtual machine information/placement information 422, the physical resource information 423, and the path information 424. Note that details of the various types of information stored in the database 420 will be described later with reference to FIG. 4 to FIG. 8.

The placement processing unit 430, for example, selects a physical host in which the VMr 122 can be placed based on the virtual machine information/placement information 422 (virtual machine information which indicates the status of use of a plurality of virtual machines, and placement information which indicates a physical host in which a plurality of virtual machines can be placed), and the physical resource information 423 which indicates the status of use of physical resources in the physical host. Moreover, for example, the placement processing unit 430 calculates the communication cost on the assumption of placing the VMr 122 in the selected physical host based on the communication information 421 that passes through the VMr 122, the placement information of the virtual machine information/placement information 422, and the path information 424. According to the communication cost, for example, because the VMr 122 can be manually placed in a physical host with a low communication cost, it is possible to eliminate unnecessary communication, and improve communication performance.

Moreover, for example, the placement processing unit 430 determines the physical host with the lowest total communication cost as the placement destination of the VMr 122, and instructs the hypervisor B121 on which the VMr 122 operates and the hypervisor of the determined placement destination to migrate the VMr 122. For example, because the VMr 122 can be manually placed in a physical host with a low communication cost, it is possible to eliminate unnecessary communication, and improve communication performance.

Note that the processing of the placement processing unit 430 will be described later with reference to FIG. 9 to FIG. 11.

(Main Information in Computer System 1)

FIG. 4 is a diagram showing an example of the communication information 421.

Information regarding the communication between the virtual machine and the physical machine (between the machines) that passes through the VMr 122 and the packet count indicating the data amount of the data communicated during a fixed period (for example, during 10 minutes) between the machines are associated and stored in the communication information 421. For example, the communication information 421 is updated to the latest information at the timing (for example, in 10-minute intervals) of reviewing the placement of the VMr 122.

FIG. 5 is a diagram showing an example of the virtual machine information/placement information 422.

Information regarding the virtual machine name which enables the identification of the virtual machine, number of virtual CPUs indicating the number of virtual CPUs assigned to the virtual machine, virtual memory size indicating the capacity of the memory assigned to the virtual machine, CPU utilization rate indicating a ratio in which the virtual machine is occupying the processing time of the CPU, and host name which enables the identification of the physical host in which the virtual machine is operating are associated and stored in the virtual machine information/placement information 422.

FIG. 6 is a diagram showing an example of the physical resource information 423.

Information regarding the physical host name which enables the identification of the physical host, CPU utilization rate indicating a ratio in which the program being executed in the physical host is occupying the processing time of the CPU, and memory utilization rate indicating a ratio in which the program being executed in the physical host is occupying the capacity of the memory are associated and stored in the physical resource information 423.

FIG. 7 is a diagram showing an example of the path information 424.

Information regarding the communication between the physical hosts and between the physical host and the physical machine (between the devices) and the hop count indicating the number of devices (in this example, L3 switches) having the path selection function between the devices are associated and stored in the path information 424. For example, the hop count can be acquired based on the traceroute from the physical host. Note that, for example, if the transmission time and the transmission efficiency will be affected by the actual physical distance more than by the transfer count, the actual distance may also be used in addition to, or in substitute for, the hop count.

FIG. 8 is a diagram showing an example of the IP address setting information 425.

Information regarding the physical host name which enables the identification of the physical host, IP address range indicating the range of IP addresses in which the virtual machine provided by the routing function can be set, and in-use IP address indicating the IP address that is being used are associated and stored in the IP address setting information 425. The IP address range is provided in correspondence with the network of L2 (L3 switch).

(Main Processing in Computer System 1)

Figure 9:
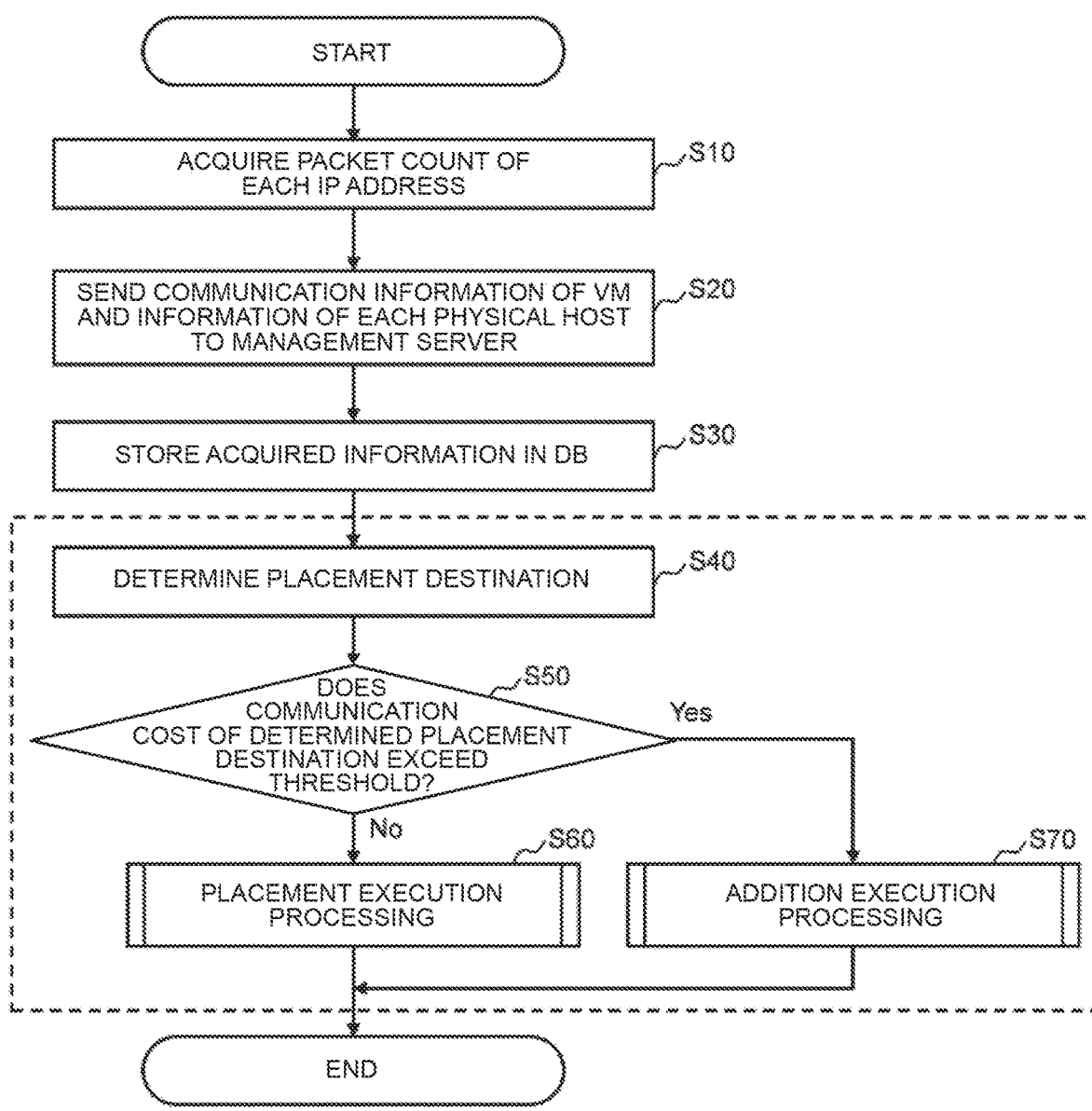
FIG. 9 is a diagram showing an example of the flowchart of the placement optimization processing according to the first embodiment.

FIG. 9 is a diagram showing an example of the flowchart of the placement optimization processing. The placement optimization processing is executed periodically (for example, in 10-minute intervals).

The hypervisor on which the virtual machine which provides a routing function operates acquires communication information (packet count for each IP address) that passes through the virtual machine (step S10). Acquisition of the packets is performed as needed, and the packet count for each IP address is acquired as the total packet count during a fixed period.

A virtual machine sends physical host information (virtual machine information, placement information, physical resource information, and path information) to the management server 400, and a virtual machine which provides a routing function additionally sends communication information to the management server 400 (step S20).

The information acquisition unit 410 of the management server 400 stores, in the database 420, physical host information sent from the virtual machine, and communication information sent from the virtual machine which provides a routing function (step S30).

When the information acquisition unit 410 receives the physical host information and stores the physical host information in the database 420, the placement processing unit 430 performs the processing of step S40 to step S70 for each virtual machine which provides a routing function.

The placement processing unit 430 calculates the communication cost of each placement destination having sufficient physical resources for placing the virtual machine (in this example, VMr 122) which provides a routing function, and determines the placement destination (step S40).

More specifically, the placement processing unit 430 foremost selects, as the candidate of the placement destination, a physical host which has been confirmed as having sufficient capacity (number of virtual CPUs, memory capacity, etc.) in the resource pool for deploying the VMr 122 based on the virtual machine information/placement information 422 and the physical resource information 423. Note that, here, the placement processing unit 430 may also select, as the candidate of the placement destination, the physical host B120 on which the VMr 122 is operating irrespective of the physical resource information 423.

Next, the placement processing unit 430 calculates the communication cost of each physical host selected as the candidate of the placement destination based on the communication information 421, the virtual machine information/placement information 422, and the path information 424. In the ensuing explanation, an example where the physical host A110, the physical host B120, and the physical host C130 have been selected as the candidates of the placement destination will be explained, and then the calculation method of the communication cost will be explained.

(Communication Cost on Assumption of Placing VMr 122 in Physical Host A110)

The hop count of the VMa 112 and the physical machine A310 is "5" (hop count "0" of same physical host+hop count "1" of VMr 122+hop count "4" in physical host A110 and physical machine A310). The packet count of the VMa 112 and the physical machine A310 is "30". Thus, the communication cost of the VMa 112 will be "150" (hop count "5"×packet count "30").

The hop count of the VMb 132 and the physical machine B320 is "8" (hop count "3" in physical host A110 and physical host C130+hop count "1" of VMr 122+hop count "4" in physical host A110 and physical machine B320). The packet count of the VMb 132 and the physical machine B320 is "100". Thus, the communication cost of the VMb 132 will be "800" (hop count "8"×packet count "100").

Accordingly, the total communication cost on the assumption of placing the VMr 122 in the physical host A110 will be "950" (communication cost "150" of VMa 112+communication cost "800" of VMb 132).

(Communication Cost on Assumption of Placing VMr 122 in Physical Host B120)

The hop count of the VMa 112 and the physical machine A310 is "6" (hop count "2" in physical host A110 and physical host B120+hop count "1" of VMr 122+hop count "3" in physical host B120 and physical machine A310). The packet count of the VMa 112 and the physical machine A310 is "30". Thus, the communication cost of the VMa 112 will be "180" (hop count "6"×packet count "30").

The hop count of the VMb 132 and the physical machine B320 is "6" (hop count "2" in physical host B120 and physical host C130+hop count "1" of VMr 122+hop count "3" in physical host B120 and physical machine B320). The packet count of the VMb 132 and the physical machine B320 is "100". Thus, the communication cost of the VMb 132 will be "600" (hop count "6"×packet count "100").

Accordingly, the total communication cost on the assumption of placing the VMr 122 in the physical host A110 will be "780" (communication cost "180" of VMa 112+communication cost "600" of VMb 132).

(Communication Cost on Assumption of Placing VMr 122 in Physical Host 0130)

The hop count of the VMa 112 and the physical machine A310 is "6" (hop count "3" in physical host A110 and physical host C130+hop count "1" of VMr 122+hop count "2" in physical host C130 and physical machine A310). The packet count of the VMa 112 and the physical machine A310 is "30". Thus, the communication cost of the VMa 112 will be "180" (hop count "6"×packet count "30").

The hop count of the VMb 132 and the physical machine B320 is "3" (hop count "0" of same physical host+hop count "1" of VMr 122+hop count "2" in physical host C130 and physical machine B320). The packet count of the VMb 132 and the physical machine B320 is "100". Thus, the communication cost of the VMb 132 will be "300" (hop count "3"×packet count "100").

Accordingly, the total communication cost on the assumption of placing the VMr 122 in the physical host C130 will be "480" (communication cost "180" of VMa 112+communication cost "300" of VMb 132).

Next, the placement processing unit 430 determines the physical host with the lowest total communication cost as the placement destination. In the foregoing example, as shown in FIG. 12(A), because the total communication cost of the physical host A110 is "950", the total communication cost of the physical host B120 is "780", and the total communication cost of the physical host C130 is "480", the physical host C130 with the lowest total communication cost is determined as the placement destination.

The placement processing unit 430 determines whether the communication cost of the determined placement destination exceeds the threshold (step S50). When the placement processing unit 430 determines that the communication cost of the determined placement destination exceeds the threshold, the placement processing unit 430 advances the processing to step S70, and, when the placement processing unit 430 determines that the communication cost of the determined placement destination does not exceed the threshold, the placement processing unit 430 advances the processing to step S60.

For example, as shown in FIG. 12(B), when the total communication cost of each physical host is calculated, in cases where the threshold is "500", communication costs above the threshold will be incurred regardless of where the VMr 122 is placed. In the foregoing case, the placement processing unit 430 determines to newly add a virtual machine which provides a routing function without changing the placement of the VMr 122, and then advances the processing to step S70.

In step S60, the placement processing unit 430 performs placement execution processing. While details will be described later with reference to FIG. 10, placement (in this example, re-placement) of the VMr 122 is performed in the placement execution processing.

In step S70, the placement processing unit 430 performs addition execution processing. While details will be described later with reference to FIG. 11, the virtual machine which provides a routing function is added in the addition execution processing.

Furthermore, when there are a plurality of virtual machines which provide a routing function, the processing of step S40 to step S70 is repeated for each virtual machine.

According to the foregoing processing, because the placement processing unit 430 calculates the communication cost for each virtual machine based on the packet count and the hop count, it is possible to determine the placement destination according to the communication status and the communication path.

Figure 10:
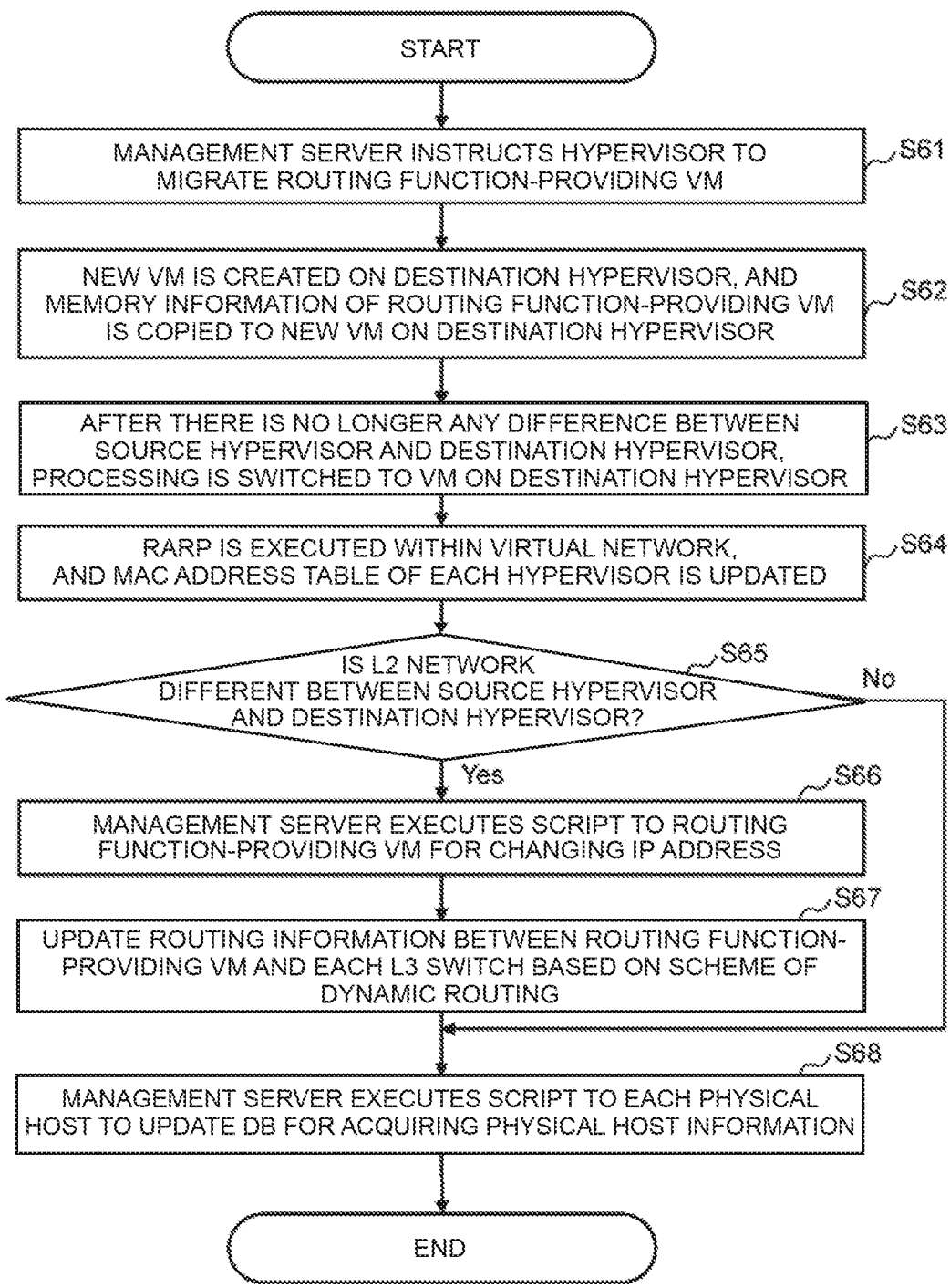
FIG. 10 is a diagram showing an example of the flowchart of the placement execution processing according to the first embodiment.

FIG. 10 is a diagram showing an example of the flowchart of the placement execution processing.

The placement processing unit 430 instructs the hypervisor of the placement source and the hypervisor of the placement destination to migrate the virtual machine which provides a routing function (step S61).

With the physical host of the placement destination, a new virtual machine is created in the hypervisor, and memory information of the virtual machine which provides a routing function is copied to the new virtual machine in the hypervisor of the placement destination (step S62). For example, when the physical host C130 is determined as the placement destination, the hypervisor C131 of the placement destination creates a virtual machine having the same image as the VMr 122. The hypervisor B121 of the placement source sends the memory information of the VMr 122 (snapshot of the memory assigned to the VMr 122) to the physical host C130.

When there is no longer any difference between the virtual machine in the hypervisor of the placement source and the virtual machine in the hypervisor of the placement destination, processing is switched to the processing of the virtual machine in the hypervisor of the placement destination (step S63). For example, the hypervisor B121 stops the activity of the VMr 122 that is operating on itself (hypervisor B121), and the hypervisor C131 starts the activity of the VMr 122 that is operating on itself (hypervisor C131).

The physical host of the placement destination updates the MAC address table of the hypervisor based on an RARP (Reverse Address Resolution Protocol) (step S64). For example, when the physical host C130 is determined as the placement destination, the MAC address table of the hypervisors A111, 121, 131 is updated by broadcasting the RARP packets within the virtual network 501.

Note that the processing of step S61 to step S64 is not limited to the foregoing contents, and existing migration technology may be adopted as needed.

The placement processing unit 430, for example, determines whether or not the network of L2 to be connected is different between the physical host of the placement source and the physical host of the placement destination based on the IP address setting information 425 (whether the migration is performed across L3 switches) (step S65). When the placement processing unit 430 determines that the network of L2 to be connected is different, the placement processing unit 430 advances the processing to step S66, and, when the placement processing unit 430 determines that the network of L2 to be connected is the same, the placement processing unit 430 advances the processing to step S68.

Figure 13:
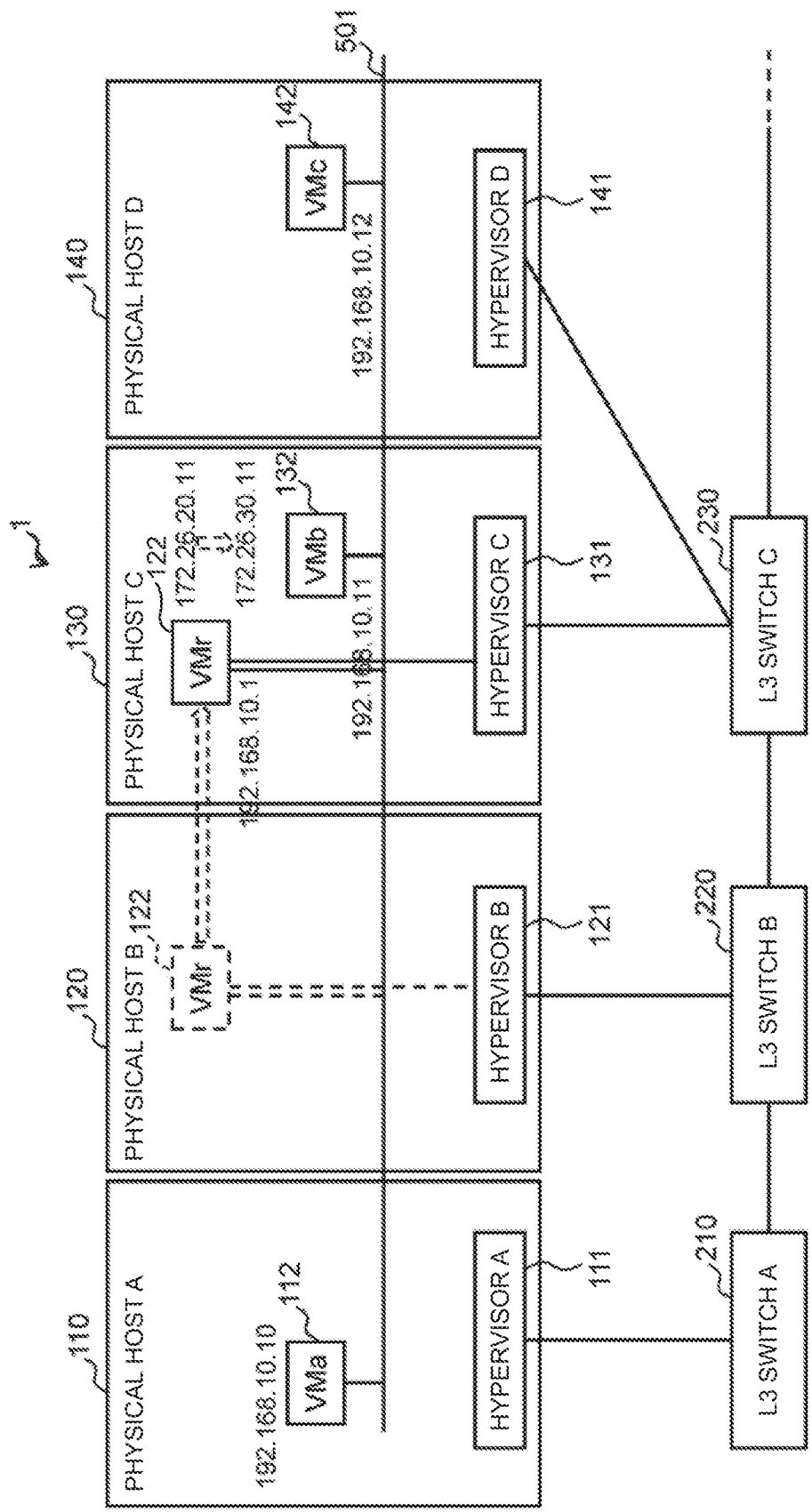
FIG. 13 is a diagram showing an example of the configuration of the computer system according to the first embodiment.

For example, as shown in FIG. 13, when the VMr 122 is migrated (placed) from the physical host B120 to the physical host C130, the IP address needs to be changed because the network of L2 is different, and the processing is advanced to step S66. Moreover, for example, when there is a virtual machine which provides a routing function in the physical host C130 and such virtual machine is to be migrated (placed) to the physical host D140 (in which the VMc 142 operates in the hypervisor D141) connected to the same L3 switch C230 as the hypervisor C131, because the network of L2 is the same, there is no need to change the IP address, and the processing is advanced to step S68.

The placement processing unit 430 executes a script of changing the IP address to the virtual machine which provides a routing function (step S66). Here, the placement processing unit 430 updates the in-use IP address of the IP address setting information 425.

The routing information is updated based on the dynamic routing between the virtual machine which provides a routing function and each L3 switch (step S67).

In step S68, the placement processing unit 430 updates the database 420 by executing a script of acquiring physical host information to each physical host, and ends the placement execution processing.

According to the foregoing processing, when a different network of L2 is used in the placement source and the placement destination, because the placement processing unit 430 assigns an IP address to the VMr 122 based on the IP address setting information 425 and updates information indicating the IP address being used, even in cases where the segment (network of L2) is exceeded, communication is possible even after the migration. For example, it will be possible to re-place the virtual machine which provides a routing function without any influence on business.

Figure 11:
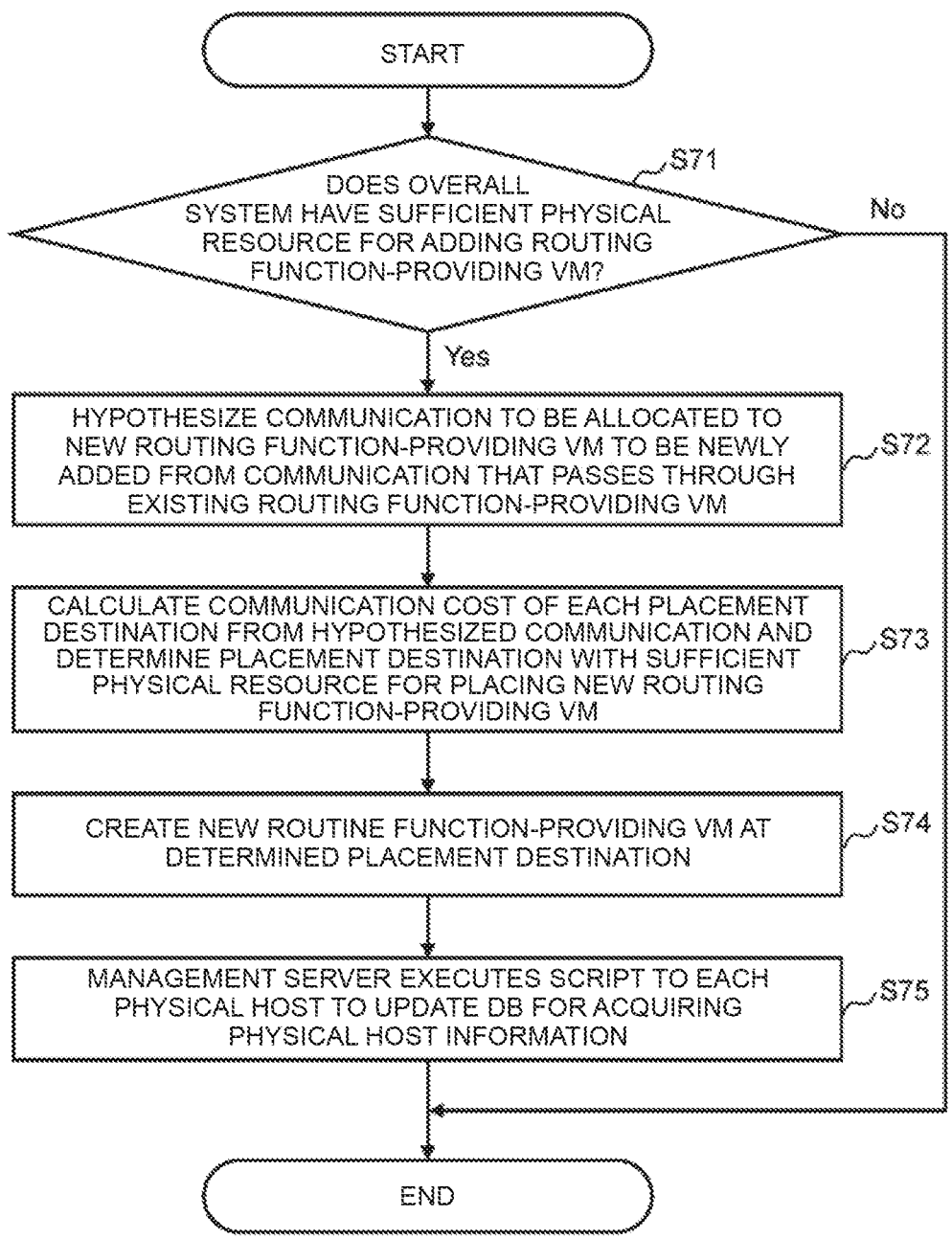
FIG. 11 is a diagram showing an example of the flowchart of the addition execution processing according to the first embodiment.

FIG. 11 is a diagram showing an example of the flowchart of the addition execution processing.

The placement processing unit 430 determines whether the overall system has sufficient physical resources for adding the virtual machine which provides a routing function (step S71). For example, the placement processing unit 430 determines whether there is a physical host having sufficient physical resources for adding a virtual machine which provides a routing function based on the virtual machine information/placement information 422 and the physical resource information 423. When the placement processing unit 430 determines that there are sufficient physical resources (there is a placeable physical host), the placement processing unit 430 advances the processing to step S72, and, when the placement processing unit 430 determines that there are no sufficient physical resources (there is no placeable physical host), the placement processing unit 430 ends the addition execution processing.

In step S72, the placement processing unit 430 assumes the communication to be assigned to a new virtual machine which provides a routing function to be newly added from the communication (communication information 421) that passes through an existing virtual machine which provides a routing function.

Figure 14:
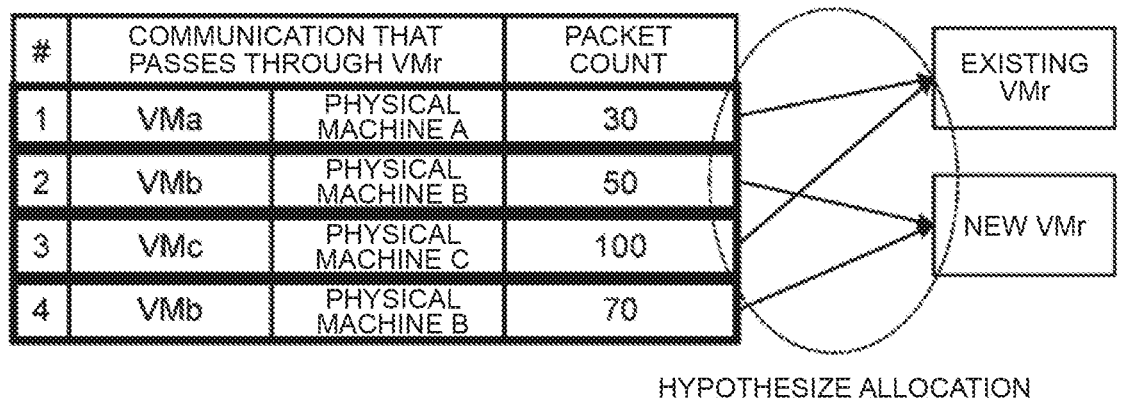
FIG. 14 is a diagram showing an example of the communication information according to the first embodiment.

For example, when the communication is the communication information shown in FIG. 14, the assignment is assumed so that the packet count is leveled between the existing virtual machine (in this example, VMr 122) and the new virtual machine.

The placement processing unit 430 calculates the communication cost of each placement destination from the assumed communication having sufficient physical resources for placing a new virtual machine which provides a routing function to be newly added, and thereby determines the placement destination (step S73). Note that, because the determination method of the placement destination is the same as step S40, the explanation thereof is omitted.

The placement processing unit 430 creates a new virtual machine which provides a routing function in the determined placement destination (step S74). Here, the physical host of the placement destination updates the MAC address table of the hypervisor within the virtual network, to which the physical host belongs, based on the RARP. Moreover, the placement processing unit 430 newly assigns an IP address to the new virtual machine which provides a routing function based on the IP address setting information 425, and updates the IP address setting information 425.

The placement processing unit 430 updates the database 420 by executing a script which acquires physical host information to each physical host (step S75), and ends the addition execution processing.

In the foregoing processing, when the placement processing unit 430 determines that each of calculated communication costs exceeds a threshold, the placement processing unit 430 determines to add a new virtual machine which provides a routing function, and assumes communication so as to level the load between the VMr 122 and the new virtual machine based on the communication information 421. Moreover, the placement processing unit 430 selects a physical host in which the new virtual machine can be placed based on the virtual machine information/placement information 422 and the physical resource information 423. Moreover, the placement processing unit 430 calculates a communication cost on the assumption that the new virtual machine is placed in the selected physical host based on the communication information 421, the placement information included in the virtual machine information/placement information 422, and the path information 424. According to the foregoing processing, it will be possible to determine the optimal placement destination according to the communication status and the communication path.

According to the foregoing configuration, it is possible to improve the communication performance.

(2) Other Embodiments

Note that, while the foregoing embodiment explained a case of applying the present invention to the computer system 1, the present invention is not limited thereto, and can also be broadly applied to other various computer systems and computers.

Moreover, while the foregoing embodiment explained a case of providing one virtual machine to one hypervisor, the present invention is not limited thereto, and one hypervisor may be provided with a plurality of virtual machines.

Moreover, while the foregoing embodiment explained a case where the management server 400 receives the communication information and the physical host information, the present invention is not limited thereto, and the management server 400 may also be configured to acquire the communication information and the physical host information.

Moreover, while the foregoing embodiment explained a case where the placement optimization processing is periodically performed, the present invention is not limited thereto, and the placement optimization processing may also be performed at the timing (designated time frame, designated day of the week, or other timing) of reviewing the pre-designated placement.

Moreover, while the foregoing embodiment explained a case of calculating the communication cost with the hop count of the VMr 122 as "1", the present invention is not limited thereto, and the communication cost may also be calculated with the hop count of the VMr 122 as "0", the communication cost may also be calculated with the hop count of the VMr 122 as "2", and the communication cost may also be calculated with the hop count of VMr 122 as another value.

Moreover, while the foregoing embodiment explained a case of determining the placement destination, and determining whether the communication cost of the determined placement destination exceeds the threshold, the present invention is not limited thereto, and it is also possible to determine whether each calculated communication cost exceeds the threshold, and the physical host of the lowest communication cost may be determined as the placement destination when there is a communication cost that has not exceeded the threshold, or it is also possible for the user to select a physical host of a communication cost that is lower than the threshold, and determine the selected physical host as the placement destination.

Moreover, while the foregoing embodiment explained a case of providing the virtual network 501 with regard to a virtual network, the present invention is not limited thereto, and another virtual network that differs from the virtual network 501 may also be provided. In the foregoing case, communication is performed via a virtual router (this may be the VMr 122, or a virtual machine which provides a routing function that differs from the VMr 122, or a distributed router which provides a routing function provided to the hypervisor) between the virtual networks.

Moreover, while the foregoing embodiment explained a case of communication information that passed through the VMr 122, the present invention is not limited thereto, and, for example, communication information that passed through the distributed router may also be used when a virtual machine which provides a routing function is added for the first time.

Moreover, in the foregoing embodiment, the same port group (group of virtual ports) may be set regarding the VMa 112, the VMr 122, and the VMb 132. Here, the restricting condition may be that only one existing virtual machine which provides a routing function can be set to one port group.

If there are restricting conditions, the placement processing unit 430 selects a placement destination having sufficient physical resources for placing the VMr 122 among the physical hosts (for example, a port group to which the VMr 122 belongs is identified, and the physical host of such port group) that satisfy the restricting conditions.

Moreover, if there are restricting conditions, the assignment is assumed so that the placement processing unit 430 satisfies the restricting conditions, and so that the packet count is leveled between the existing virtual machine and the new virtual machine. Here, the placement processing unit 430 selects the placement destination having sufficient physical resources for placing a new virtual machine among the physical hosts (a port group to which the new virtual machine belongs, and the physical port of such port group) that satisfy the restricting conditions.

Moreover, information of programs, tables, and files for realizing the respective functions in the foregoing explanation may be stored in a memory, a storage device such as a hard disk or an SSD (Solid State Drive), or a recording medium such as an IC card, an SD card, or a DVD.

Moreover, the foregoing configuration may be changed, rearranged, combined or omitted as needed to the extent that it does not exceed the gist of the present invention.

REFERENCE SIGNS LIST

1 . . . computer system, 110 . . . physical host A, 111 . . . hypervisor A, 112 . . . VMa, 120 . . . physical host B, 121 . . . hypervisor B, 122 . . . VMr, 123 . . . communication status confirmation unit, 130 . . . physical host C, 131 . . . hypervisor C, 132 . . . VMb, 210 . . . L3 switch A, 220 . . . L3 switch B, 230 . . . L3 switch C, 240 . . . L3 switch D, 310 . . . physical machine A, 320 . . . physical machine B, 400 . . . management server, 410 . . . information acquisition unit, 420 . . . database, 430 . . . placement processing unit.

The invention claimed is:

1. A computer system comprising a plurality of virtual machines which are communicable via a virtual network, wherein a plurality of physical hosts running the plurality of virtual machines and a physical machine which is communicable with the plurality of virtual machines in an environment that differs from the environment of the virtual network, comprising:

a storage unit which stores communication information that passes through a path control virtual machine from the plurality of virtual machines which performs path control of communication between each of the plurality of virtual machines and the physical machine, virtual machine information which shows a status of use of the plurality of virtual machines, placement information which shows a corresponding physical host from the plurality of physical hosts in which each of the plurality of virtual machines is placed, physical resource information which shows a status of use of physical resources in the Plurality of physical hosts, and path information which shows a path of communication between each pair of the plurality of physical hosts and between each of the plurality of physical hosts and the physical machine;

a placement processing unit which selects a physical host from the plurality of physical hosts in which the path control virtual machine can be placed based on the virtual machine information, the placement information and the physical resource information, and calculates a communication cost on an assumption that the path control virtual machine is placed in the selected physical host based on the communication information, the placement information and the path information; and a hypervisor of the selected physical host creates the path control virtual machine at the selected physical host.

2. The computer system according to claim 1, wherein the communication information includes information of a packet count indicating a data amount of the communication between each of the plurality of virtual machines and the physical machine, wherein the path information includes information of a hop count indicating a number of devices having a function of path selection between each pair of the plurality of physical hosts and between each of the plurality of physical hosts and the physical machine, and wherein the placement processing unit calculates the communication cost for each virtual machine based on the packet count and the hop count.

3. The computer system according to claim 2, wherein the placement processing unit determines a physical host having a lowest total communication cost as a placement destination of the path control virtual machine, and instructs a hypervisor on which the path control virtual machine operates and a hypervisor of the determined placement destination to migrate the path control virtual machine.

4. The computer system according to claim 1, wherein the storage unit stores information which indicates a range of IP addresses that can be assigned to each network of a layer 2, and IP address setting information including information which indicates the IP address that is being used, and wherein the placement processing unit assigns an IP address to the path control virtual machine based on the IP address setting information when a network of a different layer 2 is used at a placement source and a placement destination, and updates information indicating the IP address that is being used.

5. The computer system according to claim 1,
wherein, when the placement processing unit determines that each of calculated communication costs exceeds a threshold, the placement processing unit determines to add a new path control virtual machine, assumes communication so as to level a load between the path control virtual machine and the new path control virtual machine based on the communication information, selects a physical host from the plurality of physical hosts in which the new path control virtual machine can be placed based on the virtual machine information, the placement information and the physical resource information, and calculates a communication cost on an assumption that the new path control virtual machine is placed in the selected physical host based on the communication information, the placement information and the path information.

* * * * *